United States Patent
Grieswald et al.

(10) Patent No.: US 10,364,928 B2
(45) Date of Patent: Jul. 30, 2019

(54) RESONATOR

(71) Applicants: Umfotec GmbH, Northeim (DE);
Dietrich Denker, Ostfildern (DE)

(72) Inventors: Andre Grieswald, Bielefeld (DE); Jens Fischer, Koelln-Reisiek (DE)

(73) Assignees: UMFOTEC GMBH (DE); Dietrich Denker (DE)

( * ) Notice: Subject to any disclaimer, the term of this patent is extended or adjusted under 35 U.S.C. 154(b) by 590 days.

(21) Appl. No.: 14/915,942

(22) PCT Filed: Sep. 2, 2014

(86) PCT No.: PCT/EP2014/068621
§ 371 (c)(1),
(2) Date: Mar. 2, 2016

(87) PCT Pub. No.: WO2015/032757
PCT Pub. Date: Mar. 12, 2015

(65) Prior Publication Data
US 2016/0201621 A1    Jul. 14, 2016

(30) Foreign Application Priority Data
Sep. 3, 2013  (DE) .................... 20 2013 103 960 U

(51) Int. Cl.
*F02M 35/12* (2006.01)
*F16L 55/033* (2006.01)
*F16L 55/052* (2006.01)

(52) U.S. Cl.
CPC ....... *F16L 55/033* (2013.01); *F02M 35/1261* (2013.01); *F02M 35/1266* (2013.01); *F02M 35/1283* (2013.01); *F16L 55/052* (2013.01)

(58) Field of Classification Search
CPC .............. F16L 55/033; F02M 35/1261; F02M 35/1266; F02M 35/1283
(Continued)

(56) References Cited

U.S. PATENT DOCUMENTS 2,233,804 A * 3/1941 Bourne ................... F16L 55/02
138/30
5,020,631 A   6/1991 DeVille
(Continued)

FOREIGN PATENT DOCUMENTS

DE    198 55 708    6/2000
DE    199 56 165    5/2001
(Continued)

OTHER PUBLICATIONS

English Translation of International Preliminary Report on Patentability dated Mar. 8, 2016.
International Search Report.

*Primary Examiner* — Forrest M Phillips
(74) *Attorney, Agent, or Firm* — Gerald E. Hespos; Michael J. Porco; Matthew T. Hespos

(57) ABSTRACT

A resonator (1) has at least first and second annular chambers (2, 3, 17) arranged between inlet and outlet pieces (22, 21). An inner pipe (4) extends between the inlet piece (22) and the outlet piece (21) and has wall holes (23) that connect to the annular chambers (2, 3, 17). The first annular chamber (2) has a U-shaped circumferential wall (6) coaxial to the resonator longitudinal axis (5) and transitions at both ends to engage the inner pipe (4). The second annular chamber (3) has an L-shaped circumferential wall (12) coaxial to the resonator longitudinal axis (5). An end of the L-shaped circumferential wall remote from the first annular chamber (2) transitions into a cylindrical end piece (13), and an opposite end of the L-shaped circumferential wall lies on part of the outer wall (9) of the first annular chamber (2) extending parallel to the resonator longitudinal axis (5).

10 Claims, 6 Drawing Sheets

(58) Field of Classification Search
USPC .......................................................... 181/229
See application file for complete search history.

(56) References Cited

U.S. PATENT DOCUMENTS

| | | | | |
|---|---|---|---|---|
| 9,121,374 | B2* | 9/2015 | Denker | F16L 55/0331 |
| 9,175,648 | B2* | 11/2015 | Dobrin | F02M 35/1261 |
| 9,309,843 | B2* | 4/2016 | Hwang | F02M 35/1255 |
| 9,376,946 | B1* | 6/2016 | Eliers | F01N 1/026 |
| 9,625,077 | B2* | 4/2017 | Barbolini | F16L 55/033 |
| 9,784,399 | B2* | 10/2017 | Schuetz | B29C 49/20 |
| 9,845,004 | B2* | 12/2017 | Hedlund | B60K 13/04 |
| 2008/0264719 | A1* | 10/2008 | Seko | F02M 35/1277 |
| | | | | 181/229 |

FOREIGN PATENT DOCUMENTS

| | | |
|---|---|---|
| DE | 199 56 172 | 5/2001 |
| DE | 199 57 597 | 5/2001 |
| DE | 298 25 193 | 1/2006 |
| DE | 10 2004 049 446 | 4/2006 |
| DE | 603 01 437 | 6/2006 |
| DE | 10 2005 009 045 | 8/2006 |
| DE | 2 067 979 | 6/2009 |
| DE | 298 25 193 | 1/2010 |
| EP | 1956281 A1 | 8/2008 |

* cited by examiner

RESONATOR

BACKGROUND

1. Field of the Invention

The invention relates to a resonator for lowering airborne sound and solid-borne sound, comprising at least two annular chambers arranged between an inlet piece and an outlet piece and comprising an inner pipe, which is arranged at least between the inlet piece and the outlet piece and which has wall holes as a connection to the adjacent annular chambers.

2. Description of the Related Art

When exhaust gas turbochargers, for example, are used in conjunction with internal combustion engines, undesirable flow-generated noises result as a consequence of engine speeds, imbalances and disruptions caused by production-related warping. These flow-generated noises are lowered across a broad spectrum by appropriate resonators or dampers. In particular, the resonators or dampers are arranged between the turbocharger and the internal combustion engine or between the turbocharger and an air cooler arranged upstream of the internal combustion engine.

A resonator or tubular chamber damper is known from DE 19 55 708 B4, for example. The device disclosed therein has two adjacent annular chambers arranged between an inlet piece and an outlet piece, and an inner pipe arranged between an inlet piece and an outlet piece, said inner pipe having slit-shaped wall holes as a connection to the annular chambers surrounding the inner pipe.

In the case of the known resonator, which has essentially proved itself in practice, it is disadvantageous that when operational conditions change, i.e. the installation volume and the damping characteristics change, it must in each case be completely reconstructed, which results in particular in relatively high tool costs,.

A similar resonator is also known from DE 10 2004 049 446 A1. In this known device, the inlet piece, outlet piece, volume chamber and outlet pipe form a tubular damper unit which is formed as a single piece made of plastic. The inner pipe can be inserted into the tubular damper unit by way of the inlet piece.

The problem that the present invention seeks to solve is therefore to improve the known resonators so that they can be easily and cost-effectively adapted to different operational locations and damping conditions.

SUMMARY

The invention relates to a resonator for lowering airborne sound and solid-borne sound. The resonator has at least first and second chambers arranged between an inlet piece and an outlet piece. An inner pipe is arranged at least between the inlet piece and the outlet piece. The inner pipe has a connection to the annular chambers. The first annular chamber has a U-shaped circumferential wall coaxial to the resonator longitudinal axis. The U-shaped circumferential wall transitions at both ends into cylindrical end pieces for accommodating the inner pipe. At least the second annular chamber has an L-shaped circumferential wall coaxial to the resonator longitudinal axis. The end of the L-shaped circumferential wall facing away from the first annular chamber transitions into a cylindrical end piece, and the end of the L-shaped circumferential wall facing the first annular chamber lies on the outer wall of the first annular chamber extending parallel to the resonator longitudinal axis.

By dispensing with the single-piece construction of the chambers and by combining the annular chambers of at least one U-shaped and one L-shaped chamber, it is possible, on the one hand, for the individual chambers to be produced more cost-effectively with lower tool costs, while on the other hand, because of their modular structure, they can be more easily and cost-effectively adapted to different installation spaces and different damping conditions. In particular, the width parallel to the resonator longitudinal axis of the first and third annular chambers with an L-shaped wall can be easily modified. Another simple and cost-effective variation of the damping characteristics can be achieved via the number and geometry of the wall holes in the inner pipe which are assigned to the annular chambers. In principle, the intended damping results from the volumes of the annular chambers and from the size of the wall holes in the inner pipe that connect the inner space of the inner pipe with the volume chambers. To achieve damping across a broad spectrum, it is advantageous to design the annular chambers with differing volumes and corresponding wall holes in the inner pipe and to coordinate these with one another. Appropriate adaptation of the wall holes to the volumes of the volume chambers results in the known action mechanisms of the Helmholtz type and/or in the manner of $\lambda/4$ resonators, which serve to lower noise for the entire arrangement.

The chosen construction of the annular chambers and of the inner pipe achieves especially high production flexibility, since the manufacturing methods are not bound to any particular tools or molds and they can be rapidly and simply adapted. Manufacturing methods not bound to any particular tools or molds include processes such as welding, lasering, cutting, pressurization of semi-finished pipes, blow molding techniques, deep drawing, etc. For instance, the first and third annular chambers can be formed as a single piece, e.g. by pressurization, then in a subsequent work step, they can be separated into the first and third annular chamber by cutting or another separation process.

According to one embodiment of the invention, a third annular chamber that has an L-shaped circumferential wall coaxial to the resonator longitudinal axis is provided, which L-shaped circumferential wall, at its end facing away from the first annular chamber, transitions into a cylindrical end piece. With its end facing towards the U-shaped chamber, the L-shaped circumferential wall of the L-shaped annular chamber lies on the outer wall of the first annular chamber, said outer wall running parallel to the resonator longitudinal axis. This represents a relatively simple way to produce a resonator with three annular chambers in which the central annular chamber coaxial to the resonator longitudinal axis has a U-shaped circumferential wall and the two outer annular chambers each have an L-shaped circumferential outer wall.

According to another embodiment of the invention, the cylindrical end piece of the circumferential wall of the respective annular chamber is designed to accommodate the inner pipe. In principle, however, the cylindrical end piece of the respective L-shaped annular chamber can also be designed to accommodate the inlet piece or the outlet piece. In this case, the inlet piece and/or the outlet piece is then designed to accommodate the inner pipe.

According to another embodiment of the invention, the wall holes are designed as slits assigned to the annular chambers. The dimensions, arrangement and number of the slits are determined according to the required damping characteristics. This makes it possible also to adapt the inner pipes to changed conditions in a relatively simple and cost-effective manner.

According to another embodiment of the invention, at least one end of the inner pipe located outside the annular chambers is designed as part of the air or gas supply system. In this connection, the end of the inner pipe arranged outside of the annular chambers can be angled, with a connection flange being provided at the free end of the inner pipe.

For predetermined installation volumes, the modular design of the resonator allows the annular chambers and the inner pipe, with its wall holes, to be matched to the required damping characteristics in a relatively simple and cost-effective manner.

The resonators can be made of plastic, steel or other acceptable materials, or combinations thereof.

Further features and advantages of the invention result from the following specific description and the drawings.

DETAILED DESCRIPTION

Figure 1:
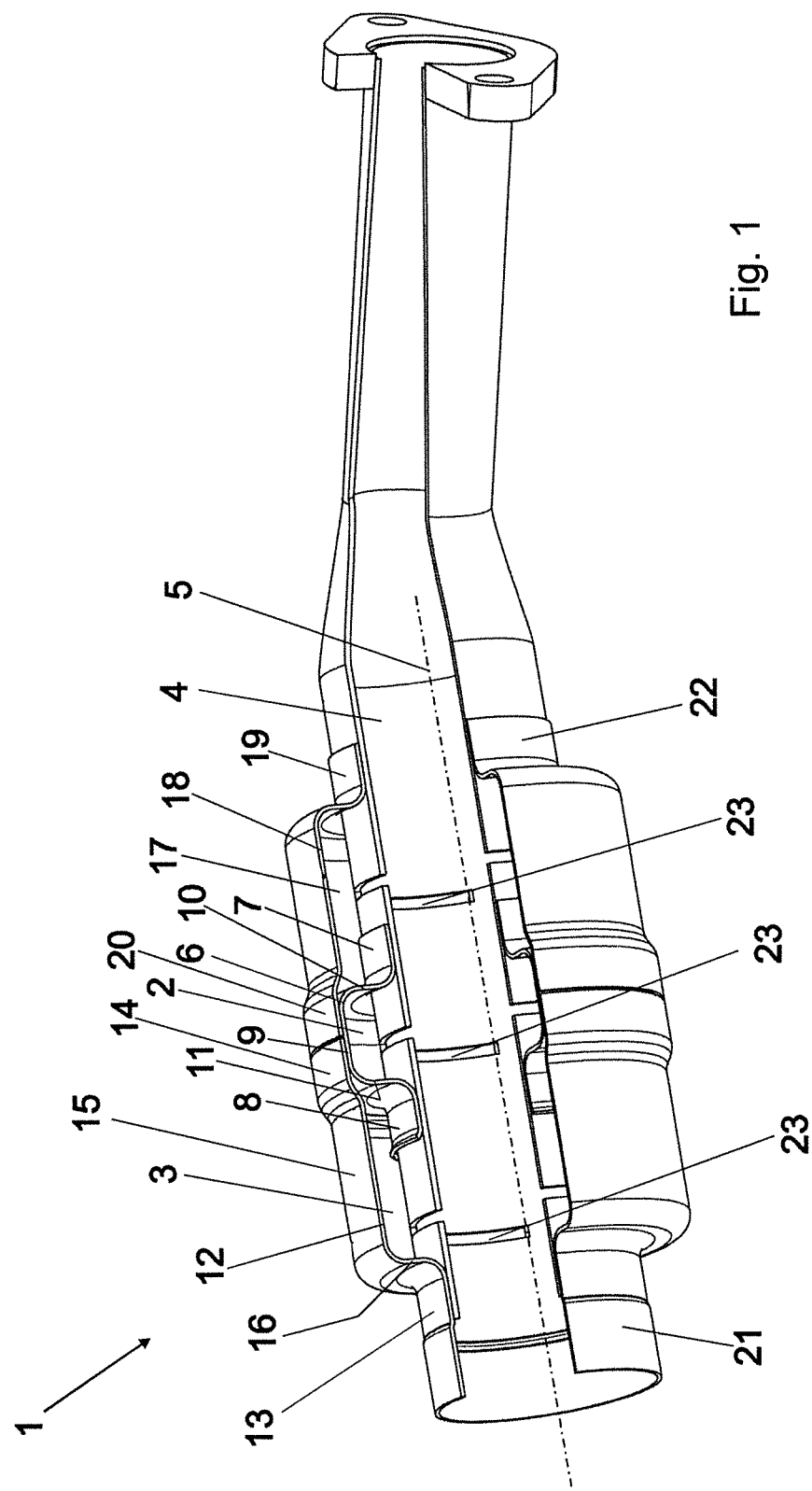
FIG. 1 is a 3D cutaway view of a resonator for lowering airborne and solid-borne sound, designed with three annular chambers.

A resonator 1 for lowering airborne and solid-borne sound essentially comprises a first annular chamber 2, a second annular chamber 3 and an inner pipe 4.

The first annular chamber 2 is arranged coaxial to a resonator longitudinal axis 5 and has an essentially U-shaped circumferential wall 6 which at both ends transitions into cylindrical end pieces 7, 8. The U-shaped wall 6 has an outer wall 9 running parallel to the resonator longitudinal axis 5, said outer wall being limited by two ring-shaped side walls 10, 11 arranged perpendicular to the resonator longitudinal axis 5. The outer wall 9 transitions into the end pieces 7, 8 by way of the side walls 10, 11.

The second annular chamber 3 has an L-shaped circumferential wall 12 coaxial to the resonator longitudinal axis 5, which L-shaped circumferential wall, at its end facing away from the first annular chamber 2, transitions into a cylindrical end piece 13. At its end 14 facing the first annular chamber 2, the L-shaped wall 12 lies on the outer wall 9 of the first annular chamber 2. The L-shaped wall 12 of the second annular chamber 3 has an outer wall 15 running parallel to the resonator longitudinal axis 5 with the end 14 facing the first annular chamber. In the direction of the end piece 13 of the second annular chamber, the outer wall 15 is limited by a side wall 16 running perpendicular to the resonator longitudinal axis 5, which side wall transitions into the end piece 13 of the second annular chamber 3. The second side wall of the second annular chamber 3 is thus formed by the second side wall 11 of the first annular chamber 2.

In accordance with the exemplary embodiments in FIGS. 1 to 5, a third annular chamber 17 is provided, which also has an L-shaped circumferential wall 18 coaxial to the resonator longitudinal axis 5, which L-shaped circumferential wall, at its end facing away from the first annular chamber 2, transitions into a cylindrical end piece 19, and at its end 20 facing the first anular chamber 2, the said L-shaped circumferential wall lies, with its outer wall 24, on the outer wall 9 of the first annular chamber 2 or the U-shaped wall 6. The outer wall 24 transitions into the end piece 19 by way of a side wall 25. The third annular chamber 17 thus essentially corresponds to the second annular chamber 3, however it will generally have a different longitudinal extension in the direction of the resonator longitudinal axis 5.

Figure 2:
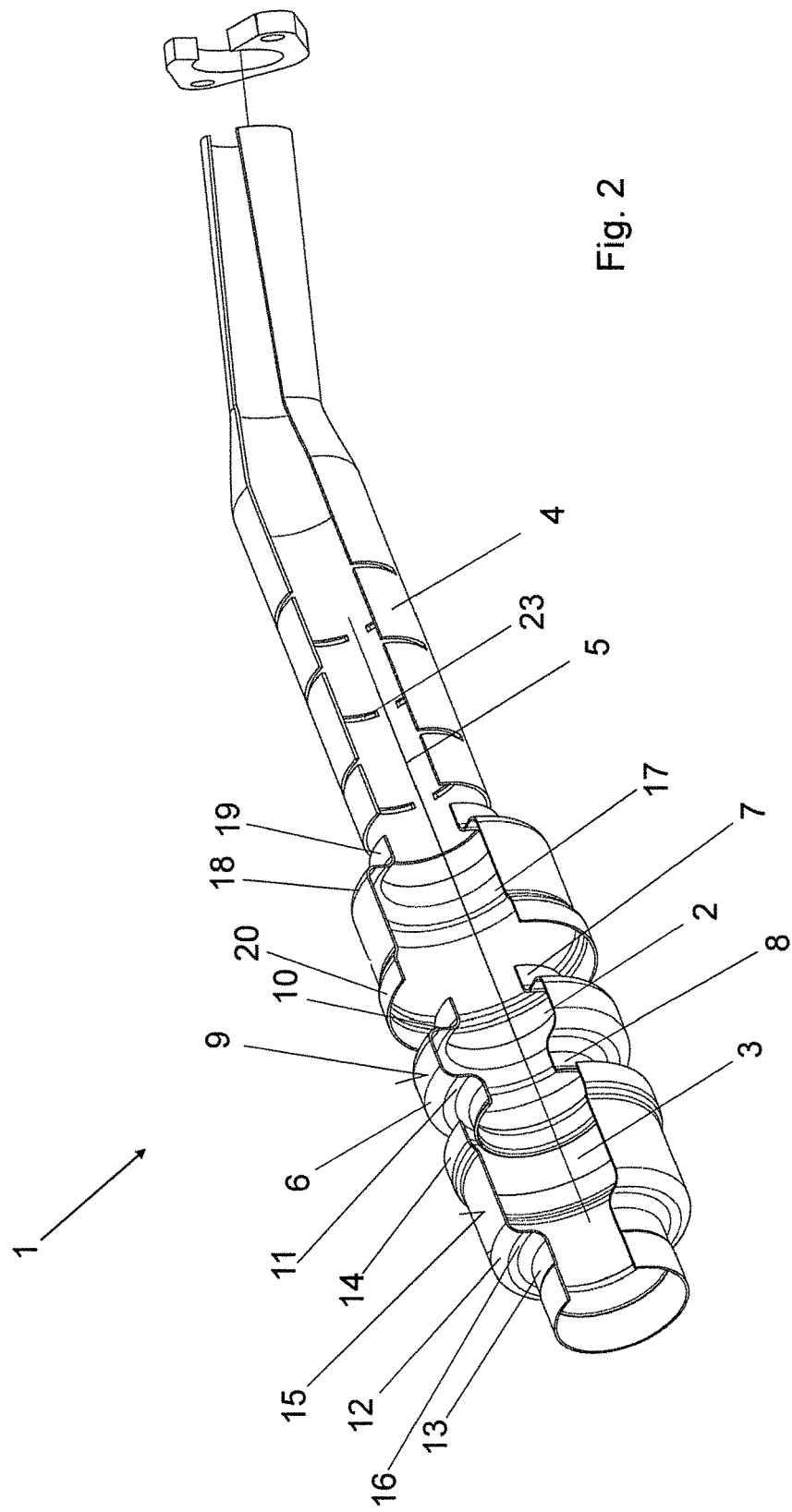
FIG. 2 is an exploded view of the resonator from FIG. 1.

According to the exemplary embodiment of FIGS. 1 and 2, the cylindrical end pieces 7, 8, 13, 19 are designed to accommodate the inner pipe 4, i.e. the inner pipe 4 is insertable into the end pieces 7, 8, 13, 19.

Figure 3:
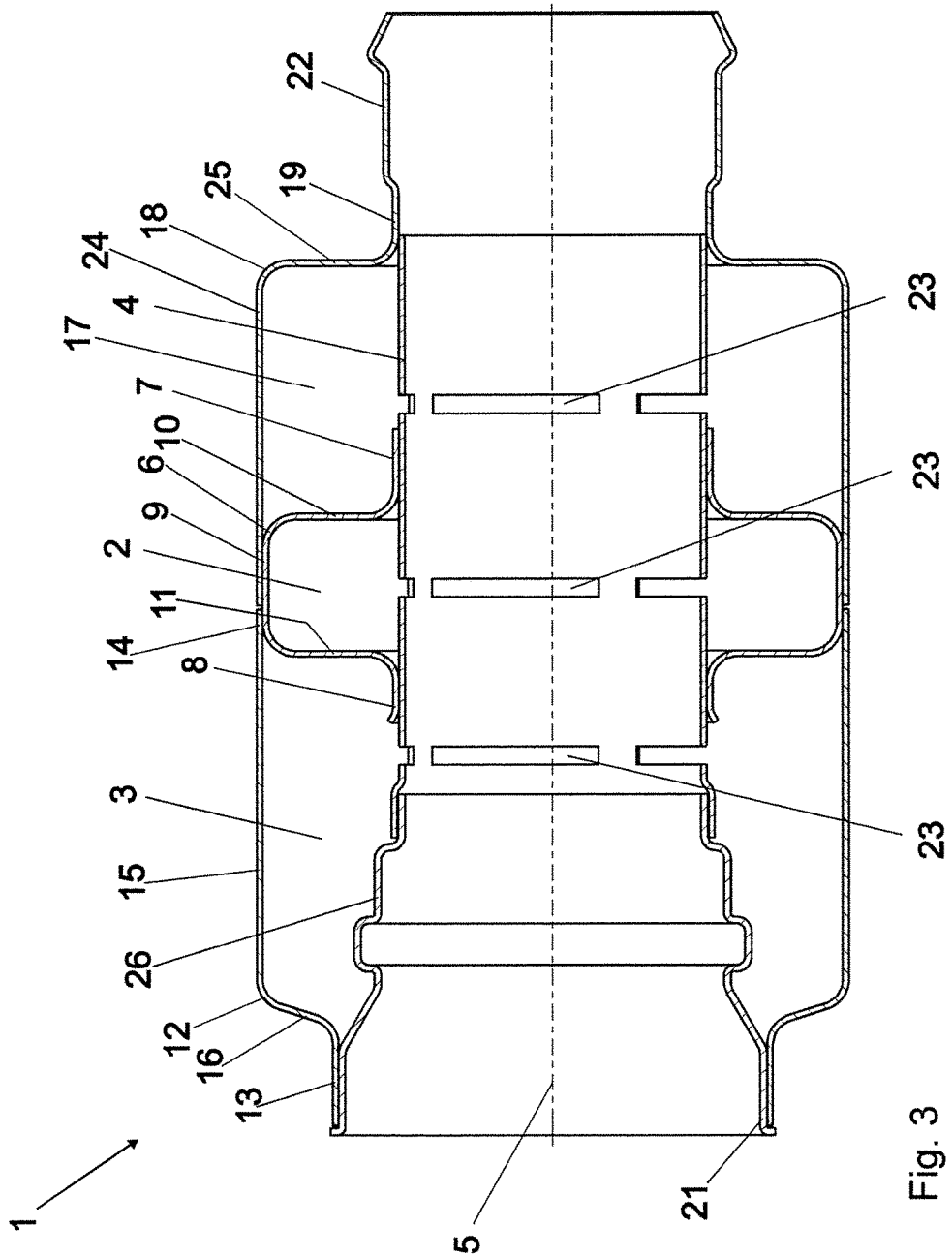
FIG. 3 is a cross-sectional lateral view of another resonator with three annular chambers.
Figure 4:
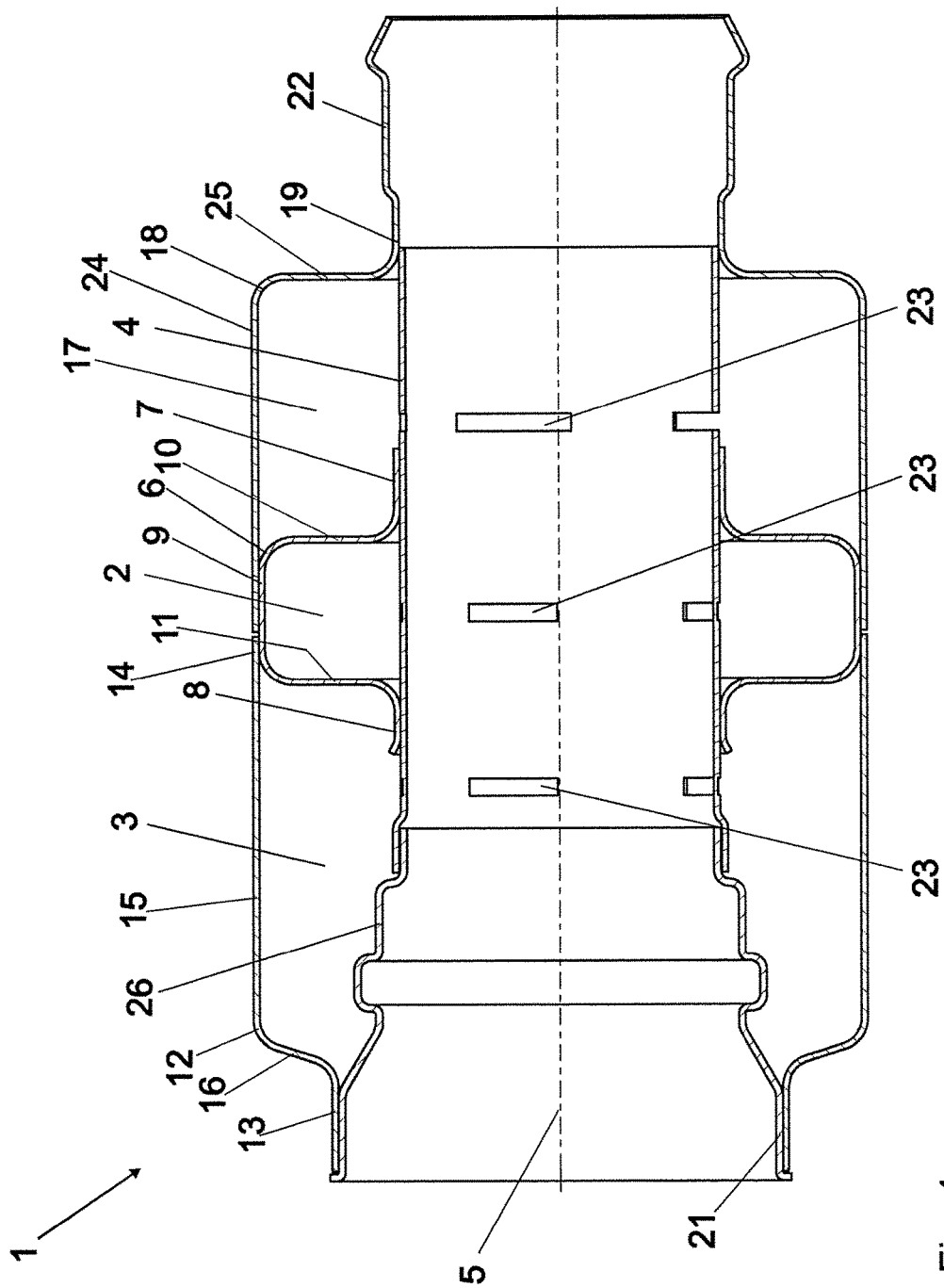
FIG. 4 is a cross-sectional lateral view of another resonator with three annular chambers and modified slit-shaped wall holes.
Figure 5:
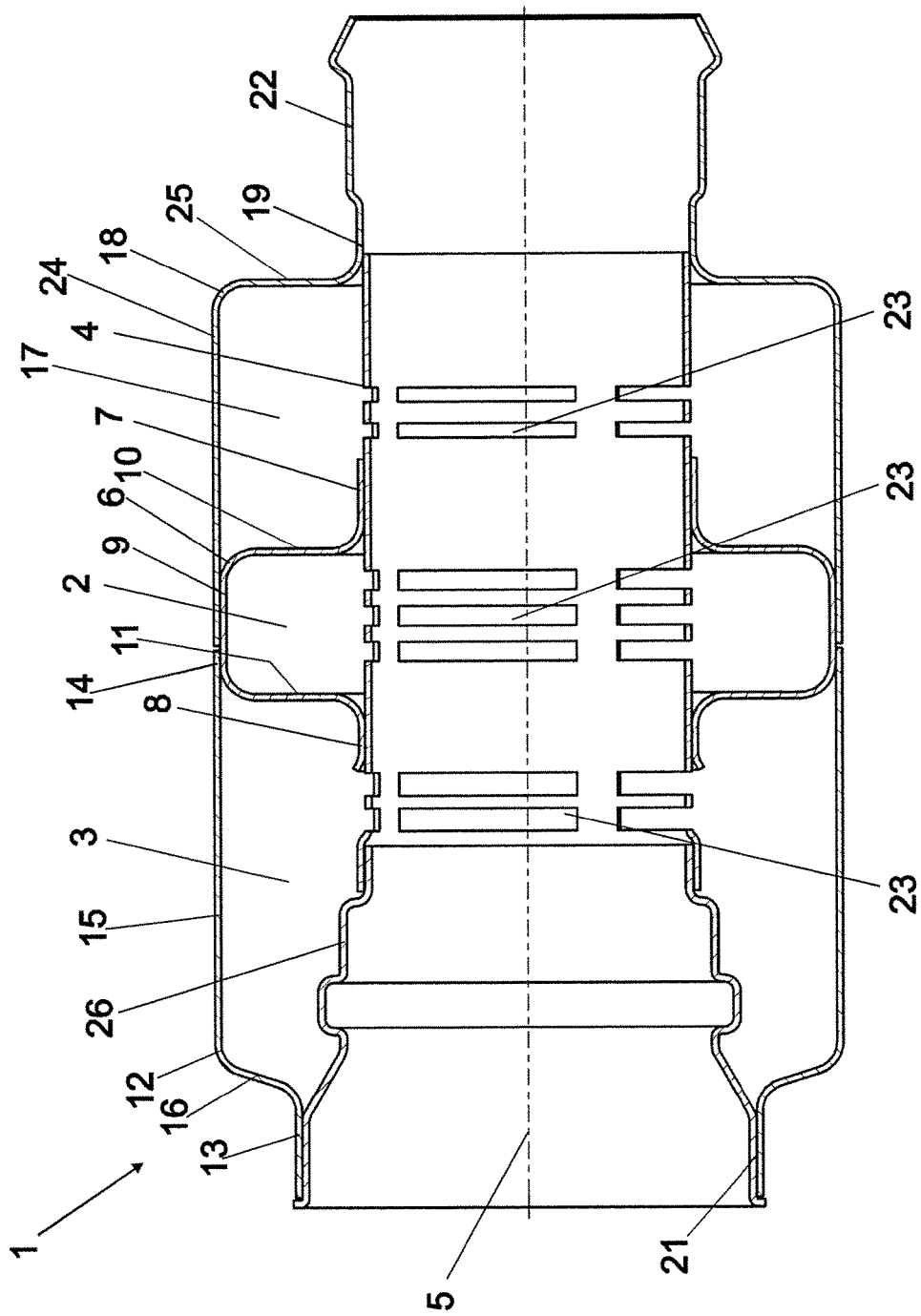
FIG. 5 is a lateral view of another resonator with three annular chambers and modified slit-shaped wall holes.

According to the exemplary embodiments of FIGS. 3 to 5, the end pieces 7, 8 and 19 of the annular chambers 2, 17 are designed to accommodate the inner pipe 4. The end piece 13 of the second annular chamber 3 is designed to accommodate an outlet piece 21 that is connected to the inner pipe 4. According to the exemplary embodiments of FIGS. 1 to 5, the end piece 19 of the third annular chamber 17 transitions into the inlet piece 22.

According to the exemplary embodiment of FIGS. 1 and 2, the inlet piece 22 is formed by the end piece 19 of the third annular chamber 17 and the outlet piece 21 is formed by the end piece 13 of the second annular chamber.

Figure 6:
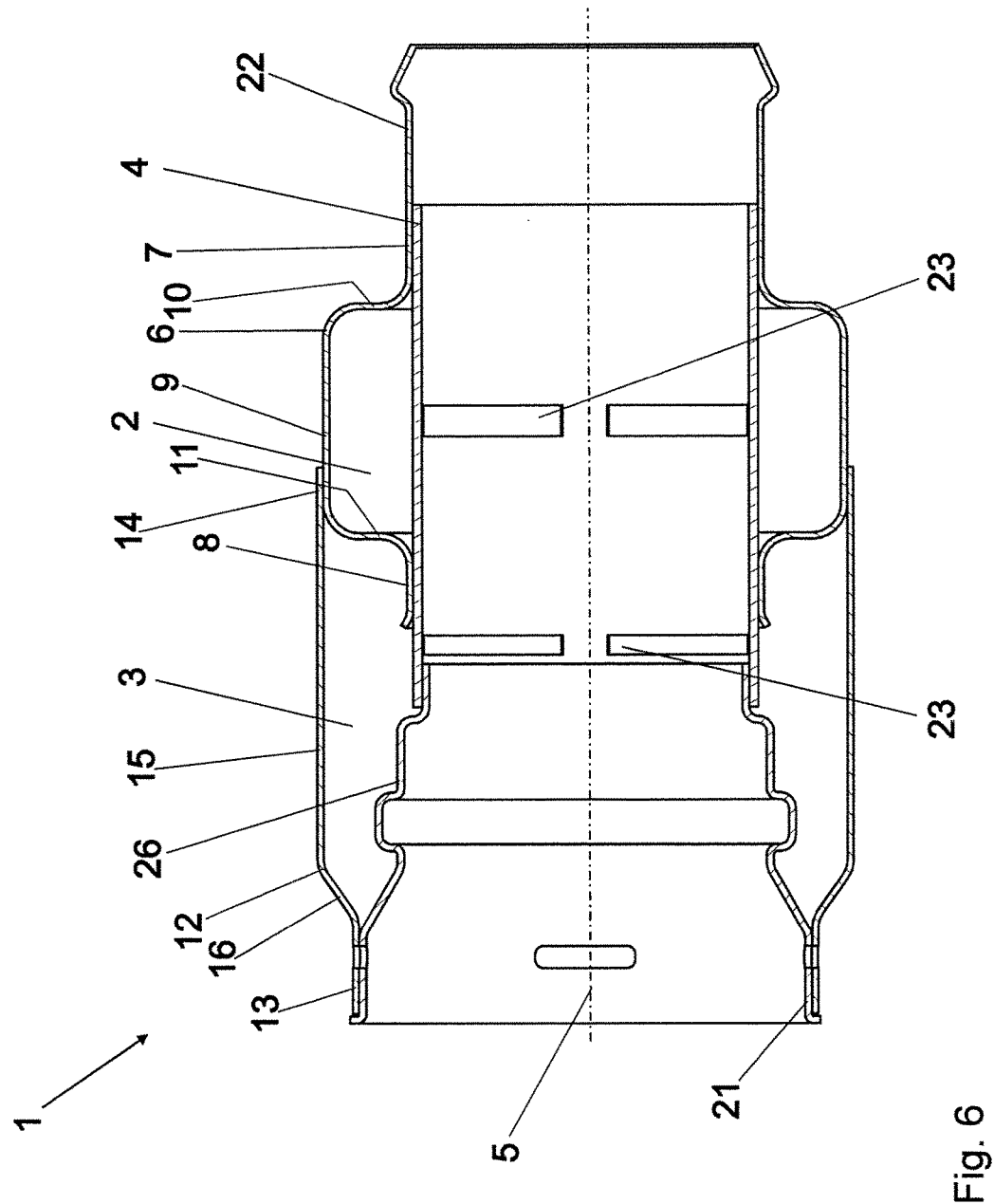
FIG. 6 is a cross-sectional lateral view of another resonator with two annular chambers.

According to the exemplary embodiment of FIG. 6, the inlet piece 22 is formed by the first end piece 7 of the first annular chamber 2. The end piece 13 of the second annular chamber is designed to accommodate the outlet piece 21, which in turn is connectable to the inner pipe.

The inner pipe 4 has wall holes 23 as a connection to the annular chambers 2, 3, 17. The wall holes 23 are designed as slits in the exemplary embodiments of FIGS. 1 to 6.

According to the exemplary embodiments of FIGS. 3 to 6, the inner pipe 4 is connected to a second inner pipe 26 that expands in steps towards the outlet piece 21.

The embodiments discussed in the specific description and shown in the figures obviously represent merely illustrative embodiments of the present invention. In the light of the present disclosure a person skilled in the art has a broad spectrum of optional variations available. In particular, additional annular chambers or other volume chambers can be added. It is also possible to reverse the position of the inlets and outlets in order to reverse the flow direction. Finally, it is also possible to divide up the inner pipe and to form a gap instead of a slit-shaped wall hole.

LIST OF REFERENCE NUMBERS 1 resonator
2 first annular chamber
3 second annular chamber
4 inner pipe
5 resonator longitudinal axis of 1
6 U-shaped wall of 2
7 first end piece of 2
8 second end piece of 2
9 outer wall of 6
10 first side wall of 6
11 second side wall of 6
12 L-shaped wall of 3
13 end piece of 3
14 end of 12
15 outer wall of 12
16 side wall of 12

17 third annular chamber
18 L-shaped wall of 17
19 end piece of 17
20 end of 18
21 outlet piece
22 inlet piece
23 wall hole
24 outer wall
25 side wall of 18
26 second inner pipe

The invention claimed is:

1. A resonator for lowering airborne sound and solid-borne sound, comprising:
    an inner pipe extending along a resonator longitudinal axis between an inlet piece and an outlet piece, the inner pipe having a wall and a plurality of wall holes formed in the wall; and
    at least first and second annular chambers engaging the plurality of wall holes to be mounted to the inner pipe between the inlet piece and the outlet piece, the at least first and second annular chambers arranged side-by-side along the resonator longitudinal axis, wherein
    the first annular chamber has a U-shaped circumferential wall including an outer wall portion coaxial to the resonator longitudinal axis and first and second ring walls connected to the outer wall portion at positions spaced along the resonator longitudinal axis and arranged normal to the resonator longitudinal axis, first and second cylindrical end pieces connected respectively to the first and second ring walls and extending in directions opposite one another along and parallel to the resonator longitudinal axis, the first and second cylindrical end pieces engaging the inner pipe, and
    the second annular chamber has an L-shaped circumferential wall including an outer wall coaxial to the resonator longitudinal axis and a side wall projecting inward from the outer wall and normal to the resonator longitudinal axis on a side of the second annular chamber opposite the first annular chamber, a cylindrical end piece arranged parallel to the resonator longitudinal axis connected to the side wall, and an end of the outer wall of the second annular chamber opposite the side wall arranged to at least partially overlap a part of the outer wall of the first annular chamber in surface-to-surface contact.

2. The resonator according to claim 1, further comprising a third annular chamber with an L-shaped circumferential wall coaxial to the resonator longitudinal axis, an end of the L-shaped circumferential wall of the third annular chamber facing away from the first annular chamber and transitioning into a cylindrical end piece, and an end of the L-shaped circumferential wall of the third annular chamber facing the first annular chamber lying on the part of the outer wall of the first annular chamber extending parallel to the resonator longitudinal axis.

3. The resonator according to claim 1, wherein
    the cylindrical end piece of the second annular chamber is engaged around the inner pipe.

4. The resonator according to claim 1, wherein the cylindrical end piece of the second annular chamber is engaged with the inlet piece or the outlet piece.

5. The resonator according to claim 4, wherein the inlet piece and/or the outlet piece engage with the inner pipe.

6. The resonator according to claim 1, wherein
    the wall holes are slits that communicate with the annular chambers.

7. The resonator according to claim 1, wherein
    the inner pipe has at least one end located outside of the annular chambers and defining a part of an air or gas supply system.

8. The resonator according to claim 7, wherein the inner pipe is angled at its end that is located outside of the annular chambers.

9. The resonator according to claim 8, further comprising a connection flange arranged at the at least one end of the inner pipe.

10. The resonator according to claim 1, wherein,
    for predetermined installation volumes, the annular chambers and the inner pipe and the wall holes of the inner pipe are matched to required damping characteristics.

* * * * *